United States Patent [19]

Ertz

[11] Patent Number: 6,002,750
[45] Date of Patent: Dec. 14, 1999

[54] METHOD AND SYSTEM FOR PROVIDING INTEGRATED WIRELINE/WIRELESS VOICE MESSAGING SERVICE

[75] Inventor: Douglas J. Ertz, Boulder, Colo.

[73] Assignee: U S West, Inc., Denver, Colo.

[21] Appl. No.: 08/989,805

[22] Filed: Dec. 12, 1997

[51] Int. Cl.$^6$ ........................................ H04M 1/64
[52] U.S. Cl. ........................ 379/88.12; 379/88.25; 379/210; 455/413
[58] Field of Search ...................... 379/67.1, 88.12, 379/88.15, 88.18, 88.22, 88.25, 201, 210, 372, 373; 455/401, 403, 412, 413, 414, 422

[56] References Cited

U.S. PATENT DOCUMENTS

| | | |
|---|---|---|
| 4,612,416 | 9/1986 | Emerson et al. . |
| 4,837,798 | 6/1989 | Cohen et al. . |
| 4,935,954 | 6/1990 | Thompson et al. . |
| 4,961,216 | 10/1990 | Baehr et al. . |
| 5,163,080 | 11/1992 | Amoroso et al. . |
| 5,187,735 | 2/1993 | Garcia et al. . |
| 5,206,901 | 4/1993 | Harlow et al. ........................ 379/211 |
| 5,208,849 | 5/1993 | Fu . |
| 5,313,515 | 5/1994 | Allen et al. .............................. 379/88 |
| 5,349,636 | 9/1994 | Irribarren . |
| 5,418,835 | 5/1995 | Frohman et al. . |
| 5,506,887 | 4/1996 | Emery et al. ............................. 379/67 |
| 5,526,403 | 6/1996 | Tam . |
| 5,598,458 | 1/1997 | Bales et al. ........................ 379/219 X |
| 5,742,905 | 4/1998 | Pepe et al. .............................. 455/461 |

*Primary Examiner*—Scott Weaver
*Attorney, Agent, or Firm*—Brooks & Kushman

[57] ABSTRACT

A method and system for providing integrated wireline/wireless voice messaging for a subscriber having a wireline telephone and a wireless handset utilizes a wireline switch supporting the wireline telephone and a wireless switch, in communication with the wireline switch, supporting the wireless handset. A voice message unit is coupled to the wireline switch and the wireless switch for receiving a voice message from a calling party for one of the wireline telephone and the wireless handset associated with the subscriber. The voice message unit then forwards the voice message to an integrated mailbox for storage therein and transmits a notification message upon receipt of the voice message to provide indication to the subscriber at both the wireline telephone and wireless handset of the stored voice message.

13 Claims, 3 Drawing Sheets

6,002,750

METHOD AND SYSTEM FOR PROVIDING INTEGRATED WIRELINE/WIRELESS VOICE MESSAGING SERVICE

TECHNICAL FIELD

This invention relates to methods and systems for providing integrated wireline/wireless voice messaging services.

BACKGROUND ART

Voice message systems, also known as voice mail systems, have become common modes of communication amongst business persons and consumers alike. If a connection from a caller to a subscriber of a voice mail system is not completed, the call is forwarded to the voice mail system wherein the caller may leave a voice message in a "mailbox" having an address corresponding to the telephone number called. Subscribers, however, typically have two mailboxes; one for their wireless handset and one for their wireline telephone.

When a caller calls a telephone number associated with the subscriber's wireline telephone and is unable to be connected to the subscriber, the caller may leave a voice message for the subscriber. At this time, the service provider servicing the wireline telephone provides an indication to the subscriber that he/she has a voice message in their wireline mailbox. Similarly, when a caller calls a telephone number associated with the subscriber's wireless telephone and is unable to be connected to the subscriber, the caller may leave a voice message for the subscriber which is stored in the wireless mailbox. The wireless service provider then provides the subscriber with a separate indication, different from the wireline indication, that he/she has a voice message in their wireless mailbox.

In order to retrieve messages left in either mailbox, the subscriber must access each mailbox separately. That is, the subscriber must dial a wireline access number to retrieve messages associated with his/her wireline telephone as well as a wireless access number in order to retrieve messages associated with his/her wireless handset. This is timely and inefficient.

Thus, there exists a need for allowing a subscriber to efficiently retrieve voice messages associated with either his/her wireline telephone or wireless handset.

DISCLOSURE OF THE INVENTION

It is a general object of the present invention to provide a method and system for providing integrated wireline/wireless voice messaging services enabling a subscriber to retrieve voice messages associated with either his/her wireline telephone or wireless handset from a single mailbox utilizing a single access number.

In carrying out the above object and other objects, features, and advantages of the present invention, a method is provided for providing integrated wireline/wireless voice messaging for a subscriber having a wireline telephone and a wireless handset. The method includes the step of receiving a voice message from a calling party for one of the wireline telephone and the wireless handset associated with the subscriber. The method also includes the step of forwarding the voice message to an integrated mailbox for storage therein. Finally, the method includes the step of transmitting a notification message upon receipt of the voice message at the integrated mailbox to provide indication to the subscriber at both the wireline telephone and wireless handset of the stored voice message.

In further carrying out the above object and other objects, features, and advantages of the present invention, a system is also provided for carrying out the steps of the above described method. The system includes a wireline switch providing telecommunications services to the wireline telephone and a wireless switch, in communication with the wireline switch, providing telecommunications services to the wireless handset. The system also includes a voice message unit coupled to the wireline switch and the wireless switch for receiving a voice message from a calling party for one of the wireline telephone and the wireless handset associated with the subscriber, forwarding the voice message to an integrated mailbox for storage therein, and transmitting a notification message upon receipt of the voice message at the integrated mailbox to provide indication to the subscriber at both the wireline telephone and wireless handset of the stored voice message.

The above object and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
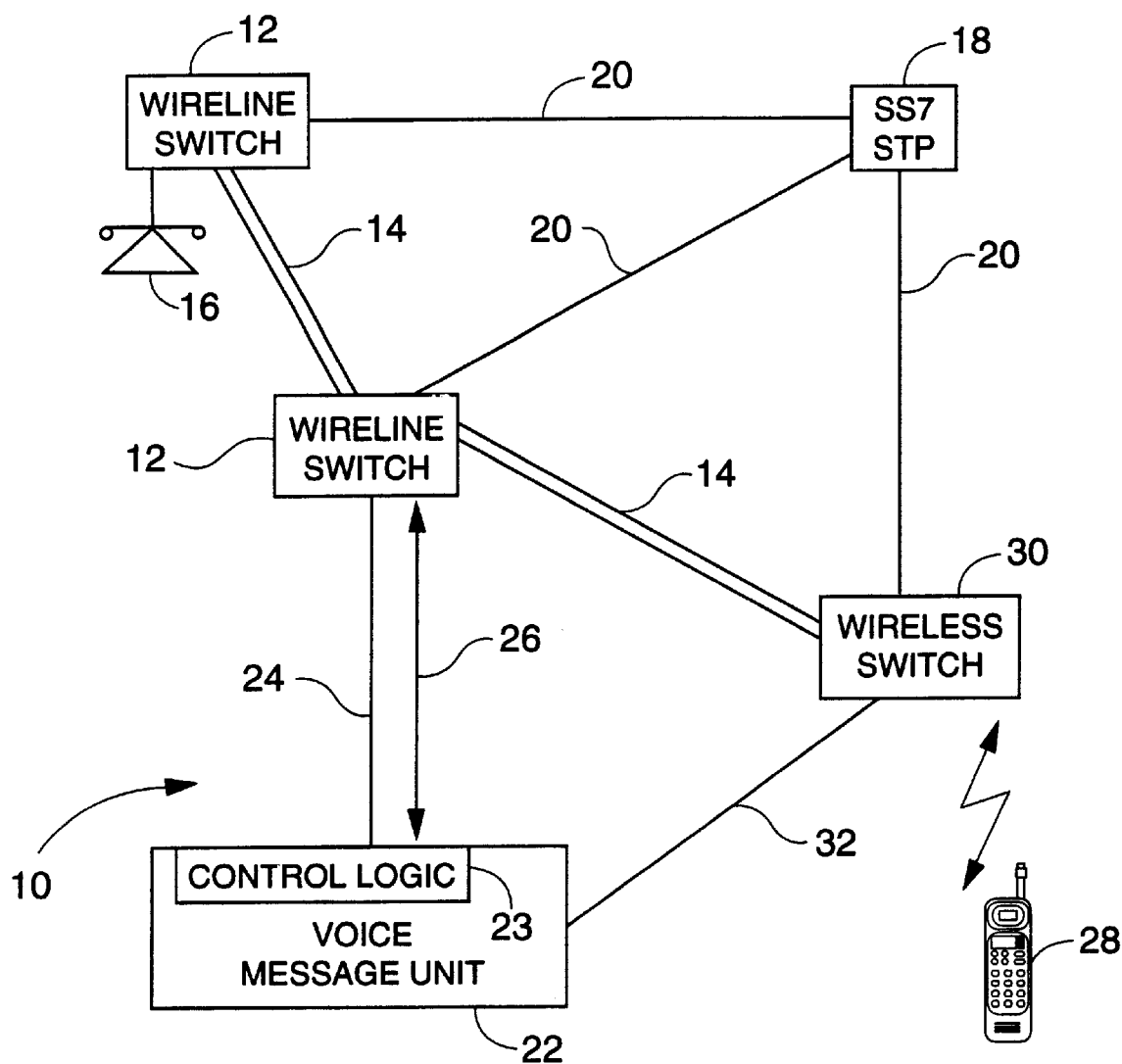
FIG. 1 is a schematic diagram illustrating the system of the present invention.

Turning now to FIG. 1, there is shown a schematic diagram illustrating the telecommunications network system of the present invention, denoted generally by reference numeral 10. The system 10 includes at least one wireline switch 12 for providing wireline services to its subscribers, such as wireline telephone 16. Each of the wireline switches 12 are connected to each other via interoffice trunks 14 for transporting voice traffic between each of the wireline switches 12.

The system 10 also includes a Signalling Service System 7 (SS7) Service Transfer Point (STP) switch 18 connected to each of the wireline switches 12 and wireless switches 30 via SS7 links 20. STP 18 relays messages between the wireline switches 12 and the wireless switches 30. The main function of STP 18 is to route SS7 messages to the correct outgoing signaling link, based on information contained in the SS7 message address fields.

The system 10 further includes a voice message unit 22 connected to one of the wireline switches 12. Voice message unit 22 is connected to wireline switch 12 via voice lines 24 for receiving and playing voice messages for subscribers. Voice message unit 22 includes control logic 23 for determining which mailbox to place the voice message and to generate messages for receipt by wireline switch 12 and wireless switch 30 instructing them to provide voice message notification to the subscriber.

Voice message unit 22 is also connected to the wireline switch 12 via a Simplified Message Desk Interface (SMDI) link 26, which is well known in the art of telecommunications. The SMDI link 26 is a two-way data link which transmits the subscriber's telephone number to the voice message unit 22 when a calling party is transferred to the voice message unit 22 to leave a message for the subscriber and translates the telephone number into the subscriber's mailbox number.

Thus, any switch 12 connected to STP 18 can route calls to any other switch 12 in the system 10 and pass calling information to the voice message unit 22 via SMDI link 26 as well as voice messages via voice lines 24.

The SMDI link 26 also serves to provide an indication to the subscriber that he/she has a voice message in their mailbox. Upon receiving the voice message, voice message unit sends a message back to the system 10 via SMDI link 26 and SS7 links 20 instructing the switch 12 servicing the wireline telephone 16 to turn on stutter dial-tone, or provide any other similar indicator, such as turn on a voice message light connected to the telephone 16.

To integrate voice messaging for a wireless handset 28 with the voice message unit 22 associated with the wireline telephone 16, a wireless switch 30 servicing the wireless handset 28 is connected to the wireline switch 12 interfacing with the voice message unit 22.

When a voice message is intended to be left for a subscriber of the wireless handset 28, the system 10 operates in the same manner as the wireline telephone 16. However, in order to provide an indication at the wireless handset 28 of a voice message in the voice message unit 22, a hardwire data link 32 is provided between the voice message unit 22 and the wireless switch 30. That is, voice message unit 22, upon receipt of a voice message for wireless handset 28, sends a message to wireless switch 30 via data link 32. Wireless switch 32 then interprets the message and similarly activates an indication at the wireless handset 28 to notify the subscriber that they have a message.

Figure 2:
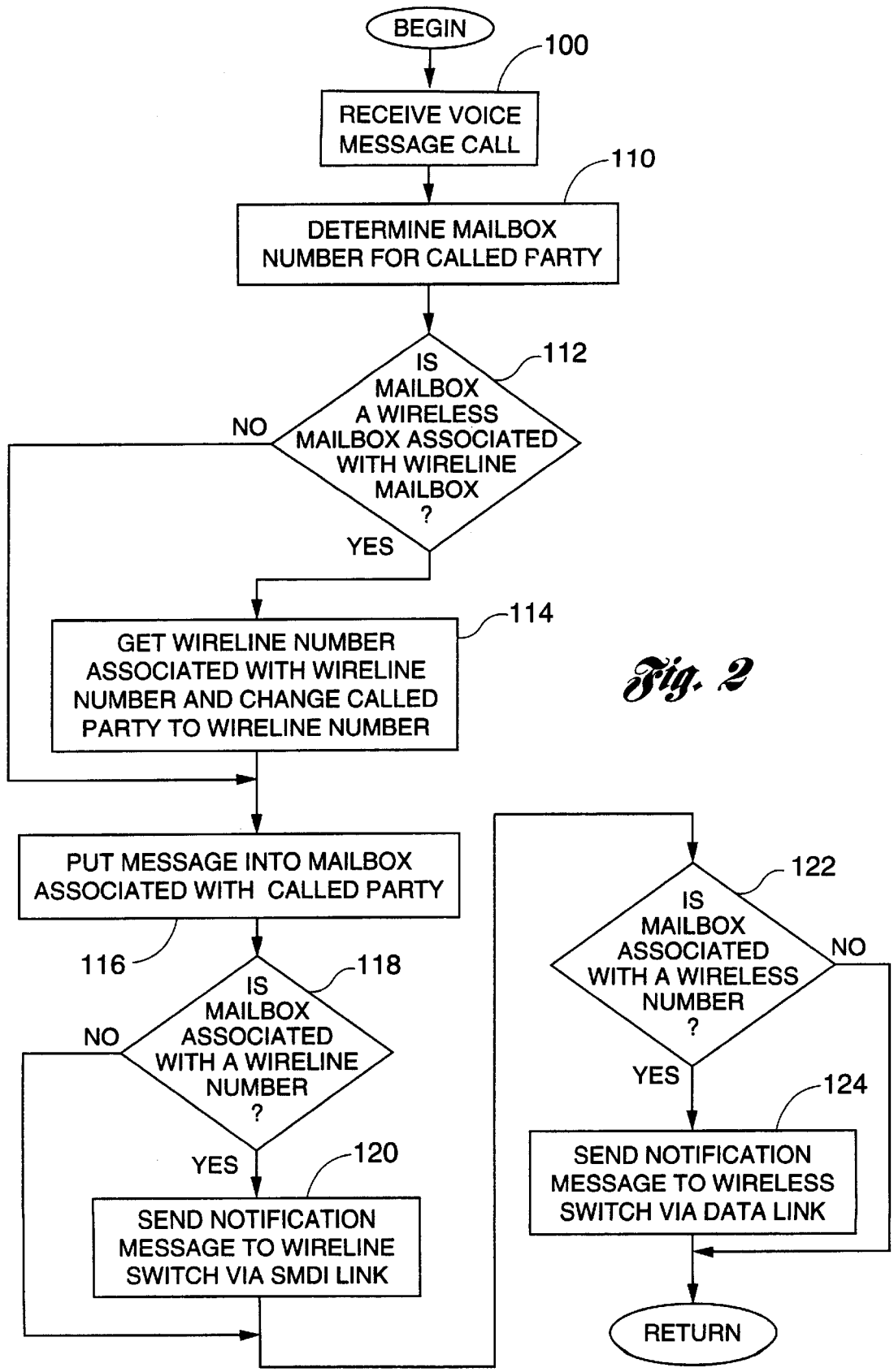
FIG. 2 is a flow diagram illustrating the general sequence of steps associated with leaving a message for a subscriber of the present invention.

Turning now to FIG. 2, there is shown a flow diagram illustrating the general sequence of steps associated with leaving a voice message for a subscriber of the present invention. Since there is no answer by the subscriber, the incoming call, from either a wireline telephone or a wireless handset, is forwarded to the voice message unit 22, as shown at block 100. The voice message unit 22 receives the voice portion of the message via voice lines 24 and the telephone number portion of the message via SMDI link 26. The telephone number portion of the message is sent to the wireline switch 12 from either another wireline switch 12 or the wireless switch 30 via STP 18 and SS7 links 20.

The control logic 23 of voice message unit 22 then determines the mailbox number for the called party, as shown at block 110. This is done by comparing the called number with a list of mailbox numbers to determine the mailbox number associated with the called party.

A determination is then made by control logic 23 as to whether or not the mailbox number is a wireless mailbox associated with a wireline mailbox, as shown at conditional block 112. The system can be set up so that the wireless phone number has a transfer mailbox associated with it in which once the wireless mailbox is identified, a transfer is made to a wireline mailbox, as shown at block 114. This may be the case when a wireless voice message system is being integrated with an existing wireline voice message system. Alternatively, the system could also be set up in a reverse manner in which the wireline phone number has a transfer mailbox associated with it.

The voice message is placed into the corresponding mailbox, as shown at block 116. If the mailbox is associated with a wireline number, a notification message is transmitted by control logic 23 for receipt by wireline switch 12 via SMDI link 26, as shown at conditional block 118 and block 120. If the mailbox is associated with a wireless number only, or in addition to being associated with a wireline number, a notification signal is transmitted to the wireless switch 30 via data link 32, as shown at conditional block 122 and block 124.

Figure 3:
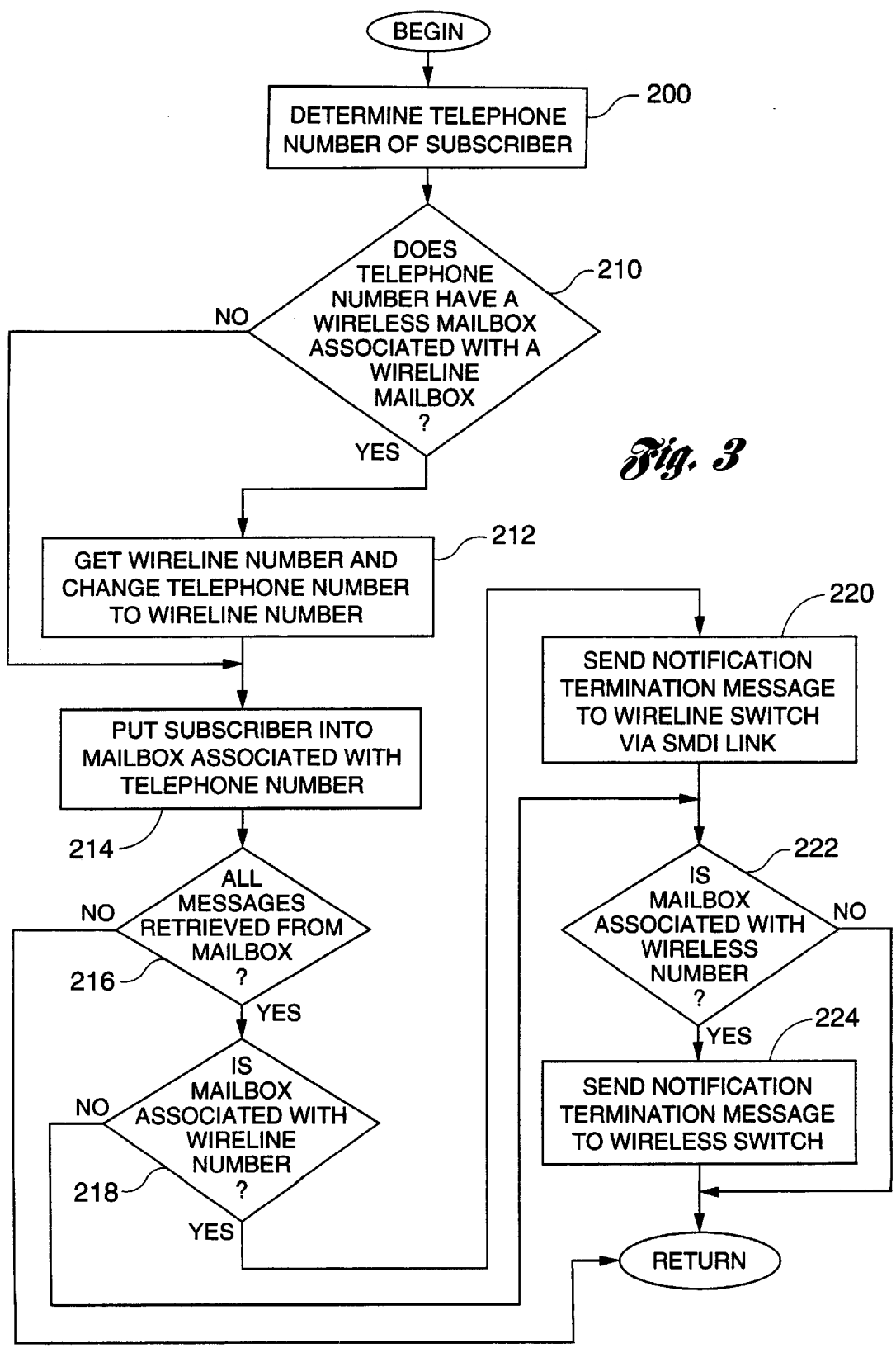
FIG. 3 is a flow diagram illustrating the general sequence of steps associated with retrieving a voice message by a subscriber of the present invention.

Turning now to FIG. 3, there is shown a flow diagram illustrating the general sequence of steps associated with retrieving a message recorded for the subscriber. Upon accessing the voice message unit 22, control logic 23 determines the telephone number of the calling party, as shown at block 200. This can be accomplished utilizing Automatic Number Identifier (ANI) or by prompting the caller to enter his/her telephone number, or any other similar method.

Next, control logic 23 then determines whether or not the telephone number has a wireless mailbox associated with a wireline mailbox, as shown at conditional block 210. This is accomplished by comparing the telephone number with a look-up table to determine the type of mailbox associated therewith. If the telephone number does have a wireline mailbox associated with it, the method proceeds to determine the wireline telephone number, as shown at block 212.

The subscriber is then put into their mailbox, as shown at block 214. After the subscriber has retrieved a message, control logic 23 determines whether or not the subscriber has retrieved all of his/her messages, as shown at conditional block 216. If not, no further action is taken. However, if all messages have been retrieved, a notification termination message is transmitted as follows. First, it is determined whether the mailbox is associated with a wireline number, as shown at conditional block 218. If so, the notification termination message is sent to the wireline switch 12 via SMDI link 26, as shown at block 220. This message instructs switch 12 to turn off their voice message notification since the subscriber no longer has any messages left in their mailbox.

The method proceeds to determine if the mailbox has a wireless number associated therewith, as shown at conditional block 222. If not; the program returns and no further action is taken. If so, then the notification termination message is also sent to the wireless switch 30 via data link 32, as shown at block 224.

Thus, the present invention allows subscribers to only have to remember one access number to call in order to retrieve their voice messages. In addition, the present invention allows for an inexpensive support of wireline and wireless voice messaging platforms.

While the best modes for carrying out the invention have been described in detail, those familiar with the art to which this invention relates will recognize various alternative designs and embodiments for practicing the invention as defined by the following claims.

What is claimed is:

1. A method for providing integrated wireline/wireless voice messaging for a subscriber having a wireline telephone serviced by a wireline switch and a wireless handset serviced by a wireless switch, the method comprising:

receiving a voice message from a calling party for one of the wireline telephone and the wireless handset associated with the subscriber;

forwarding the voice message to an integrated mailbox for storage therein, wherein forwarding the voice message includes determining the telephone number called by the calling party, determining whether the telephone number called by the calling party is a wireless phone number corresponding to the wireless handset or a wireline phone number corresponding to the wireline telephone, and determining a wireline phone number based on the wireless phone number or a wireless phone number based on the wireline phone number; and transmitting a notification message upon receipt of the voice message at the integrated mailbox to provide indication to the subscriber at both the wireline telephone and wireless handset of the stored voice message.

2. The method as recited in claim 1 wherein transmitting the notification message comprises:

transmitting a wireless notification message to the wireless switch; and transmitting a wireline notification message to the wireline switch.

3. The method as recited in claim 1 further comprising:

receiving a retrieval signal indicating the subscriber has retrieved all voice messages in the integrated mailbox; and transmitting a notification termination message upon receipt of the retrieval signal so as to turn off notification of stored voice messages for the subscriber.

4. The method as recited in claim 3 wherein transmitting the notification termination message comprises:

transmitting a wireless notification termination message to the wireless switch; and transmitting a wireline notification termination message to the wireline switch.

5. A system for providing integrated wireline/wireless voice messaging for a subscriber having a wireline telephone and a wireless handset, the system comprising:

a wireline switch providing telecommunications services to the wireline telephone;

a wireless switch providing telecommunications services to the wireless handset and in communication with the wireline switch; and a voice message unit coupled to the wireline switch and the wireless switch operative to receive a voice message from a calling party for one of the wireline telephone and the wireless handset associated with the subscriber, forward the voice message to an integrated mailbox for storage therein by determining the telephone number called by the calling party, determining whether the telephone number called by the calling party is a wireless phone number corresponding to the wireless handset or a wireline phone number corresponding to the wireline telephone, and determining a wireline phone number based on the wireless phone number or a wireless phone number based on the wireline phone number, and transmit a notification message upon receipt of the voice message at the integrated mailbox to provide indication to the subscriber at both the wireline telephone and wireless handset of the stored voice message.

6. The system as recited in claim 5 wherein the voice message unit, in transmitting the notification message, is further operative to transmit a wireless notification message to the wireless switch and transmit a wireline notification message to the wireline switch.

7. The system as recited in claim 5 wherein the voice message unit is further operative to receive a retrieval signal indicating the subscriber has retrieved all voice messages in the integrated mailbox and transmit a notification termination message upon receipt of the retrieval signal so as to turn off notification of stored voice messages for the subscriber.

8. The system as recited in claim 7 wherein the voice message unit, in transmitting the notification termination message, is further operative to transmit a wireless notification termination message to the wireless switch and transmit a wireline notification termination message to the wireline switch.

9. The system as recited in claim 5 wherein the voice message unit is coupled to the wireline switch via a physical two-way data link for transmitting and receiving signalling data to and from the wireline switch and from the wireless switch.

10. The system as recited in claim 9 wherein the two-way data link is an SMDI data link.

11. The system as recited in claim 10 wherein the voice message unit is coupled to the wireless switch via a physical data link for transmitting signalling data to the wireless switch.

12. The system as recited in claim 11 wherein the physical data link is an X.25 data link.

13. The system as recited in claim 12 wherein the X.25 data link is a SMS data link.

* * * * *